(12) United States Patent
Zanotti et al.

(10) Patent No.: US 8,336,374 B2
(45) Date of Patent: Dec. 25, 2012

(54) METHOD OF DETERMINING OPENING OF AN INTERNAL COMBUSTION ENGINE INTAKE VALVE

(75) Inventors: Massimo Zanotti, Vado (IT); Fabio Sensi, Casalecchio di Reno (IT); Marco Panciroli, Bologna (IT); Andrea Leoni, Perugia (IT); Francesco Alunni, San Sisto (IT); Filippo Cavanna, Bologna (IT)

(73) Assignee: Magneti Marelli S.p.A. (IT)

( * ) Notice: Subject to any disclaimer, the term of this patent is extended or adjusted under 35 U.S.C. 154(b) by 304 days.

(21) Appl. No.: 12/887,170

(22) Filed: Sep. 21, 2010

(65) Prior Publication Data
US 2011/0167900 A1    Jul. 14, 2011

(30) Foreign Application Priority Data

Sep. 21, 2009   (IT) ............................... BO2009A0599

(51) Int. Cl.
*G01M 15/05*   (2006.01)
(52) U.S. Cl. ................................. 73/114.79; 73/114.37
(58) Field of Classification Search ............... 73/114.31, 73/114.32, 114.33, 114.37, 114.77, 114.79
See application file for complete search history.

(56) References Cited

U.S. PATENT DOCUMENTS

| | | | | |
|---|---|---|---|---|
| 4,987,877 A | * | 1/1991 | Nakaniwa | ..................... 123/494 |
| 6,349,592 B1 | * | 2/2002 | Hirasawa et al. | .......... 73/114.33 |
| 7,801,691 B2 | * | 9/2010 | Panciroli et al. | ................. 702/47 |

FOREIGN PATENT DOCUMENTS
EP           1811161           7/2007

OTHER PUBLICATIONS

European Search Report for corresponding European Patent Application.

* cited by examiner

*Primary Examiner* — Eric S McCall
(74) *Attorney, Agent, or Firm* — Bliss McGlynn, P.C.

(57) ABSTRACT

A method of determining opening of an intake valve of an internal combustion engine, the method including the steps of: determining the time pattern of an intake pressure in an intake manifold of the internal combustion engine, the time pattern of the rotation speed of a drive shaft of the internal combustion engine, or the time pattern of a voltage at the terminals of a battery of the internal combustion engine; determining an intake-frequency component of the intake pressure, the rotation speed, or the voltage; and
determining opening of the intake valve as a function of the intake-frequency component of the intake pressure, and also as a function of the intake-frequency component of the rotation speed or voltage.

15 Claims, 3 Drawing Sheets

US 8,336,374 B2

METHOD OF DETERMINING OPENING OF AN INTERNAL COMBUSTION ENGINE INTAKE VALVE

CROSS-REFERENCE TO RELATED APPLICATION

This application claims priority under 35 U.S.C. §119 to Italian Patent Application No. B02009A-000599, filed on Sep. 21, 2009 with the Italian Patent and Trademark Office, the disclosure of which is incorporated herein in its entirety by reference.

TECHNICAL FIELD

The present invention relates to a method of determining opening of an internal combustion engine intake valve.

BACKGROUND ART

An internal combustion engine comprises at least one cylinder, in which a piston, connected mechanically to a drive shaft, moves back and forth. The cylinder is connected to an intake manifold by at least one intake valve, and to an exhaust manifold by at least one exhaust valve. And the position of the intake and exhaust valves of a conventional internal combustion engine is controlled directly by one or two camshafts powered by the drive shaft.

A new type of internal combustion engine (known commercially as "Multi-Air") has recently been proposed comprising a valve opening control device, which controls the opening angle and lift of the intake valves to control the power generated by the engine. The valve opening control device employs a conventional camshaft powered by the drive shaft, and comprises, for each intake valve, an electrically controlled hydraulic actuator (i.e. controlled by a solenoid valve) interposed between the intake valve stem and the camshaft. By controlling each hydraulic actuator, the power transmitted by the camshaft to the intake valve stem can be adjusted to adjust the actual lift of the intake valve. In other words, the control device adjusts the actual lift of the intake valve of each cylinder at each engine cycle, independently of the other intake valves.

In the event of a malfunction in the hydraulic circuit of the valve opening control device hydraulic actuators, or in a hydraulic actuator or solenoid valve of the control device, the position of one or more intake valves may not be controlled correctly (typically, the intake valve may not open). In other words, opening of the intake valves is not guaranteed mechanically by the camshaft, because of the hydraulic actuators between the camshaft and the intake valve stems. Which means that a malfunction in the hydraulic actuators or the control/power chain of the hydraulic actuators may prevent the intake valves from opening correctly.

Malfunctions of this sort never have a destructive effect on the internal combustion engine—on account of the maximum travel of the intake valve being determined by the camshaft profile, which is designed to prevent any mechanical interference between the intake valves and pistons—but must be diagnosed immediately, because of the negative effect they have on the power generated by the engine and the quality of combustion inside the cylinders.

To diagnose non-opening of one or more intake valves, it has been proposed to provide each intake valve with a position sensor (possibly an ON/OFF type, i.e. a microswitch) to real-time determine the actual position of the valve. This solution, however, involves considerable cost, not only in terms of purchase, installation and wiring, but also to insulate the position sensors to withstand the high temperatures generated in the cylinder head area of an internal combustion engine.

US2008236267A1 describes a method of determining correct opening of internal combustion engine intake and/or exhaust valves, by determining the intake pressure along an intake pipe of the engine; comparing the intake pressure with a reference signal; and diagnosing operating failure of the intake and/or exhaust valves when the difference between the intake pressure and the reference signal exceeds a given tolerance threshold.

DESCRIPTION OF THE INVENTION

It is an object of the present invention to provide a method of determining opening of an internal combustion engine intake valve, designed to eliminate the above drawbacks, and which, in particular, is cheap and easy to implement.

According to the present invention, there is provided a method of determining opening of an internal combustion engine intake valve, as claimed in the attached Claims.

BRIEF DESCRIPTION OF THE DRAWINGS

A non-limiting embodiment of the present invention will be described by way of example with reference to the accompanying drawings, in which.

PREFERRED EMBODIMENTS OF THE INVENTION

Figure 1:
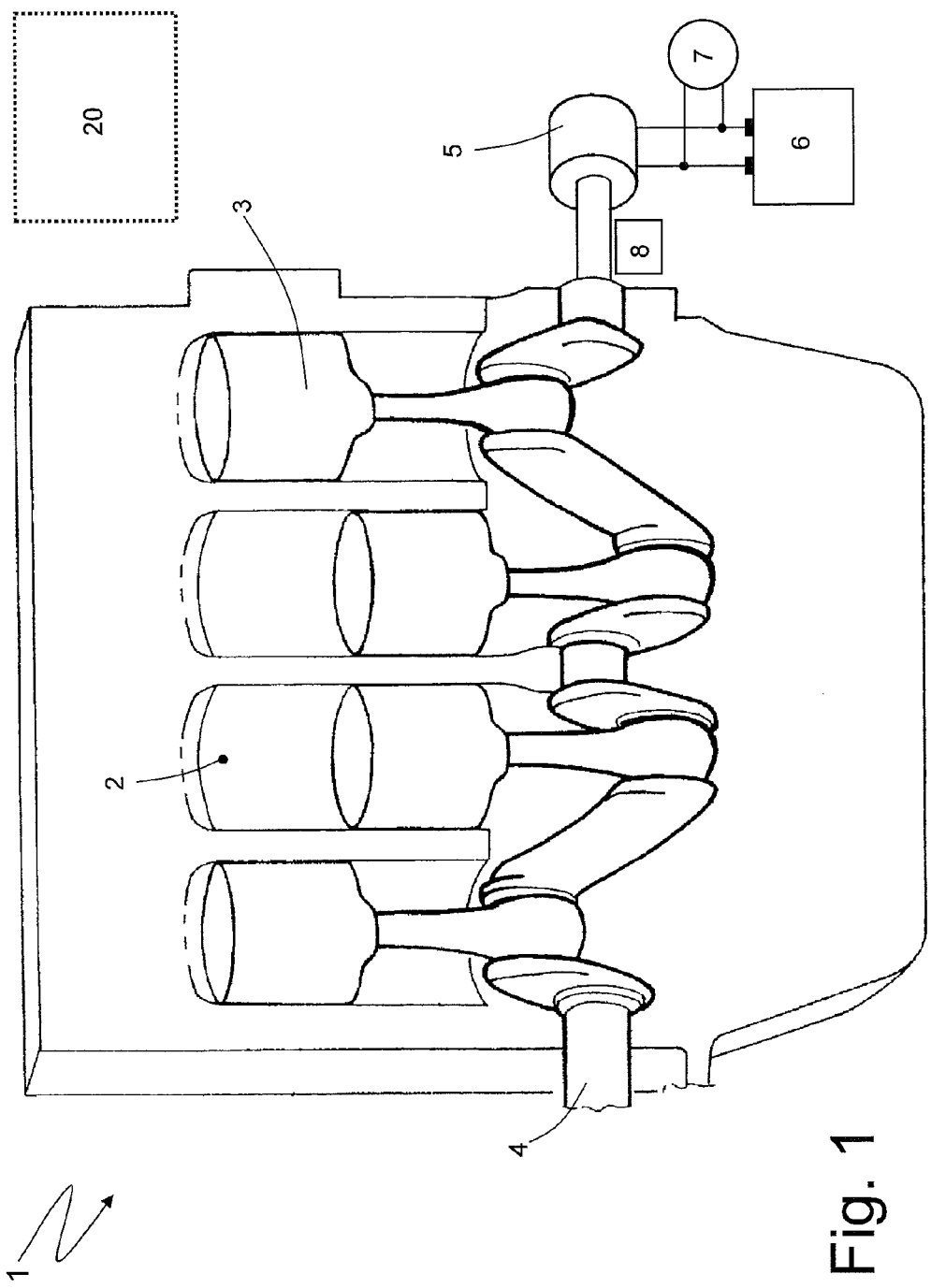
FIG. 1 shows a schematic of an internal combustion engine featuring a control unit implementing the method of determining opening of an internal combustion engine intake valve according to the present invention.

Number 1 in FIG. 1 indicates as a whole an internal combustion engine comprising four in-line cylinders 2, each housing a piston 3 connected mechanically by a connecting rod to a drive shaft 4 to transmit the power generated by combustion inside cylinder 2 to drive shaft 4.

Drive shaft 4 is fitted with an electric starter motor 5 powered by a battery 6 to rotate drive shaft 4 to start internal combustion engine 1. A voltmeter 7 is connected to the terminals of battery 6 to measure a battery voltage V; and drive shaft 4 is equipped with a speed sensor 8 (typically a pulse wheel) to determine the rotation speed ω of drive shaft 4.

Figure 2:
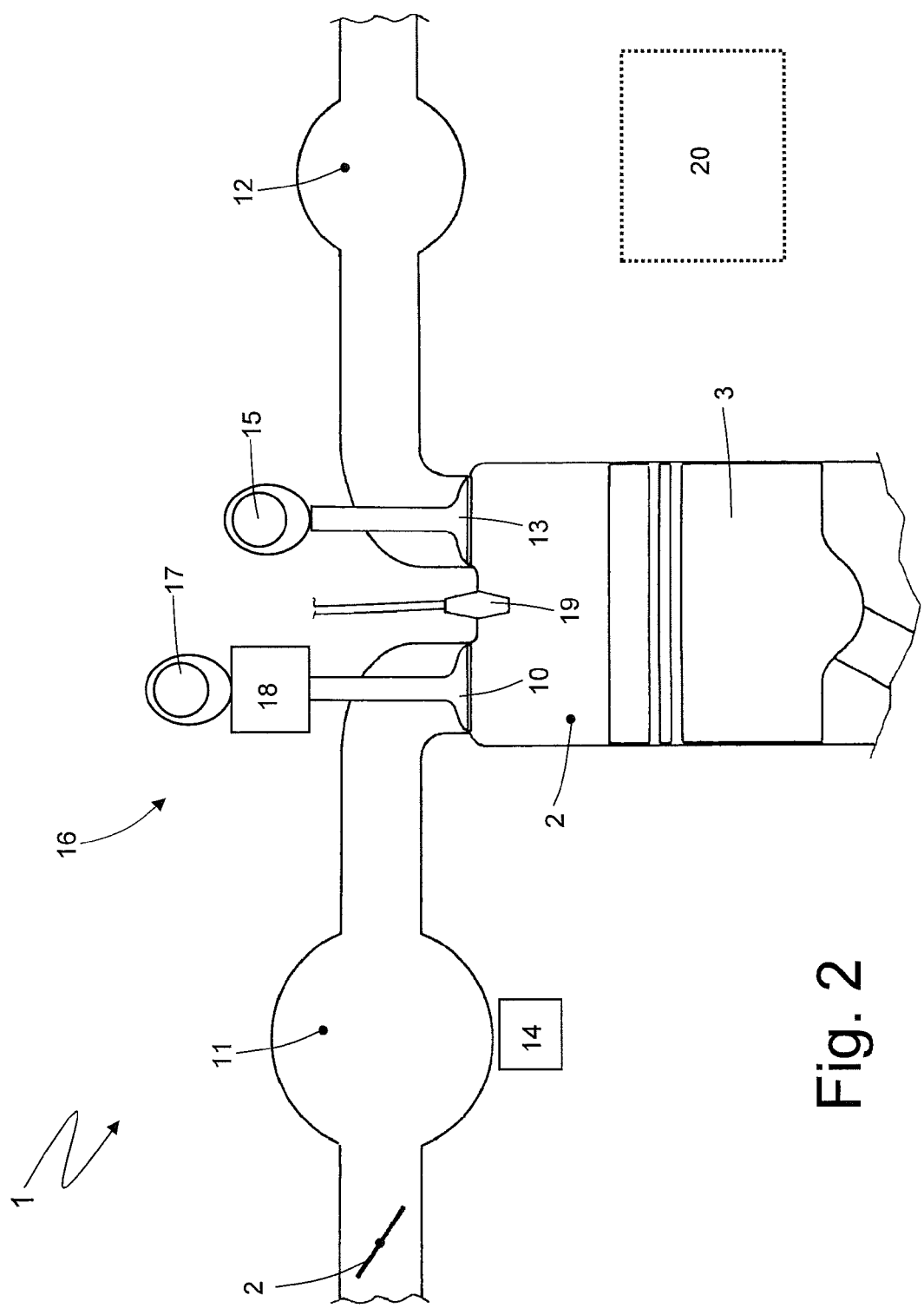
FIG. 2 shows a schematic of a cylinder of the FIG. 1 internal combustion engine.
Figure 3:
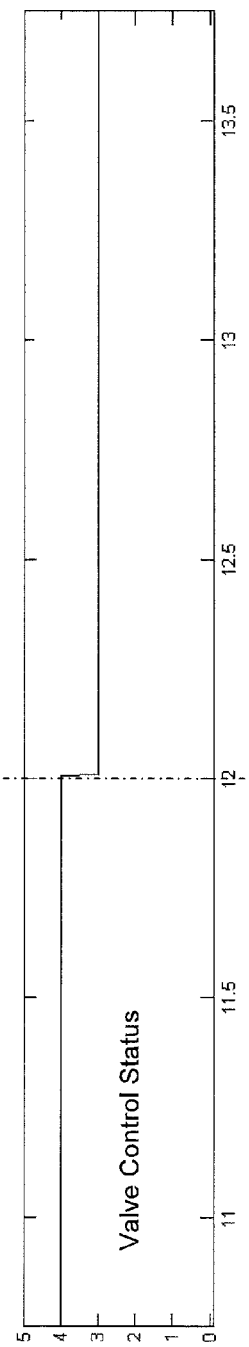
FIGS. 3-6 show time graphs of physical quantities of the FIG. 1 internal combustion engine, used in determining opening of the intake valves.
Figure 4:
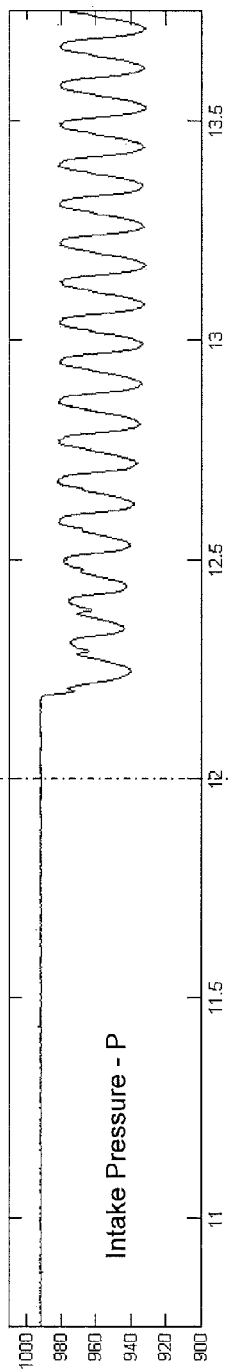
Figure 5:
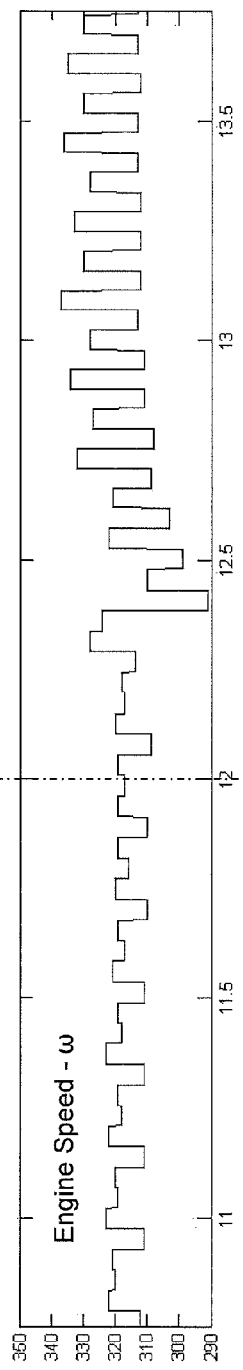
Figure 6:
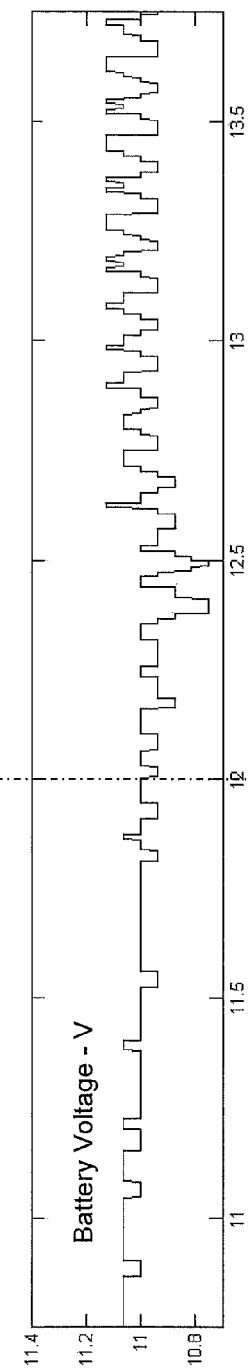

As shown in FIG. 2, internal combustion engine 1 comprises an intake manifold 9 connected to each cylinder 2 by two intake valves 10 (only one shown in FIG. 2) and supplied with fresh (i.e. outside) air via a throttle valve 11 movable between a closed position and a fully-open position; and an exhaust manifold 12 connected to each cylinder 2 by two exhaust valves 13 (only one shown in FIG. 2), and connected to an exhaust pipe (not shown) for discharging combustion gases into the atmosphere. Intake manifold 9 houses a pressure sensor 14 for measuring an intake pressure P.

The position of each exhaust valve 13 is controlled directly by a camshaft 15 powered by drive shaft 4, whereas the position of intake valves 10 is controlled by a valve opening control device 16, which controls the opening angle and lift of intake valves 10 to control the power generated by the engine by means of intake valves 10. Valve opening control device 16 employs a conventional camshaft 17 powered by drive shaft 4, and, for each intake valve 10, comprises an electrically controlled hydraulic actuator 18 (i.e. controlled by a solenoid valve) interposed between the stem of intake valve 10 and camshaft 17. By controlling each hydraulic actuator 18, the power transmitted by camshaft 17 to the stem of intake valve 10 can be adjusted to adjust the actual lift of intake valve 10. In other words, for each cylinder 2 and at each engine cycle, control device 16 provides for adjusting the actual lift of each intake valve 10 independently of the other intake valves 10.

Internal combustion engine 1 in FIG. 2 is a direct-injection type, so each cylinder 2 has an injector 19 for injecting fuel directly into cylinder 2. In a different embodiment not shown, internal combustion engine 1 is an indirect-injection type, so injector 19 of each cylinder 2 is located upstream from the cylinder, in an intake pipe connecting intake manifold 9 to cylinder 2.

Finally, internal combustion engine 1 comprises a control unit 20 for monitoring operation of engine 1 and, among other things, determining opening of intake valves 10.

The following is a description of the way in which control unit 20 determines opening of intake valves 10.

The intake frequency, i.e. the frequency at which the intake strokes of internal combustion engine 1 are performed, is directly proportional to the rotation speed $\omega$ of drive shaft 4, and more specifically equals the rotation speed $\omega$ of drive shaft 4 multiplied by the number of intakes for each complete turn of drive shaft 4, which depends on the number of cylinders 2 and the geometry of drive shaft 4. For example, each cylinder 2 of internal combustion engine 1 performs an intake stroke every two complete turns of drive shaft 4, and cylinders 2 are divided into two oppositely operating pairs. Which means that, for each complete turn of drive shaft 4, intake occurs in two cylinders 2, so the intake frequency equals the rotation speed $\omega$ of drive shaft 4; whereas, in a one-cylinder internal combustion engine 1, intake frequency equals half the rotation speed $\omega$ of drive shaft 4.

Because intake by a cylinder 2 lowers intake pressure P, and no intake by cylinders 2 increases intake pressure P, a "pump" effect is produced inside intake manifold 9 when intake valves 10 open properly, so the intake pressure P in intake manifold 9 oscillates at the intake frequency. Moreover, when an intake valve 10 opens, its return spring (not shown) is simultaneously compressed, thus subjecting camshaft 17 to a pulsating resisting torque caused by the need to compress the return spring. The pulsating resisting torques to which camshaft 17 is subjected (and therefore also drive shaft 4 powering camshaft 17) produce oscillations, obviously at intake frequency, in the rotation speed co of drive shaft 4 (which decreases when the pulsating resisting torque occurs, and increases when the pulsating resisting torque ceases). This oscillation in the rotation speed $\omega$ of drive shaft 4 is particularly felt at the start-up stage—when drive shaft 4 is rotated by starter motor 5, which generates a small amount of power and is therefore more strongly affected by the pulsating resisting torques caused by the need to compress the return springs of intake valves 10—but is also present, though less evident, even when internal combustion engine 1 is running.

At start-up, as opposed to determining oscillation of the rotation speed co of drive shaft 4 caused by the need to compress the return springs of intake valves 10, it is possible to determine oscillation of voltage V of battery 6 powering starter motor 5. More specifically, the pulsating resisting torque on the one hand causes a reduction in the rotation speed $\omega$ of drive shaft 4, and on the other an increase in the power demanded of starter motor 5, which therefore draws more electric current from and so reduces the voltage V of battery 6. In other words, at start-up of internal combustion engine 1, the oscillations at intake frequency in the rotation speed $\omega$ of drive shaft 4 and in voltage V of battery 6 are two equivalent effects of the same cause: the need to compress the return springs of intake valves 10.

This is shown clearly in the FIG. 3-6 graphs (which refer to start-up, with no combustion in cylinders 2). The FIG. 3 graph shows the status of intake valves 10, which remain fully closed up to 12 seconds after start-up (the point indicated by the vertical dot-and-dash line), and only open normally 12 seconds after start-up. As shown clearly in FIGS. 4-6, intake pressure P (FIG. 4), rotation speed $\omega$ of drive shaft 4 (FIG. 5), and battery voltage V (FIG. 6) oscillate only slightly or not at all as long as intake valves 10 are fully closed, but oscillate sharply when intake valves 10 open normally.

In actual use, control unit 20 measures the time pattern of two physical quantities of internal combustion engine 1: the intake pressure P measured by pressure sensor 14 in intake manifold 9; and the rotation speed $\omega$ of drive shaft 4 (for which battery voltage V measured by voltmeter 7 can only be substituted at the start-up stage). Control unit 20 also determines an intake-frequency component of each physical quantity. In a preferred embodiment, this is done by control unit 20 filtering the time pattern of each physical quantity using a high-pass filter (i.e. a first-order filter with a cutoff frequency slightly lower than intake frequency). Alternatively, a band-pass filter centred about the intake frequency may be used, to eliminate high-frequency noise. And control unit 20 determines opening of intake valves 10 as a function of the intake-frequency components of the two physical quantities.

In a preferred embodiment, control unit 20 only determines non-opening of intake valves 10 if both the intake-frequency components of the two physical quantities are below respective threshold values. In an alternative embodiment, control unit 20 determines non-opening of intake valves 10 if at least one of the intake-frequency components of the two physical quantities is below a respective threshold value.

In other words, opening of intake valves 10 is determined by determining the presence of intake-frequency oscillations in intake pressure P and rotation speed $\omega$. If intake-frequency oscillations are present in intake pressure P and rotation speed $\omega$, intake valves 10 are judged as opening normally; conversely, if no (or "insufficient") intake-frequency oscillations are present in intake pressure P and rotation speed $\omega$, intake valves 10 are judged as not opening at all (or opening "insufficiently", i.e. abnormally).

For example, when the intake-frequency component of each physical quantity is below a first threshold value, intake valves 10 are judged fully-closed (i.e. do not open at all). When the intake-frequency component of each physical quantity is between the first threshold value and a second threshold value (higher than the first), intake valves 10 are judged as opening "insufficiently" or "abnormally" (in which case, some of intake valves 10 usually open normally, while others remain fully closed). And, when the intake-frequency component of each physical quantity exceeds the second threshold value, intake valves 10 are judged as opening normally. More than two threshold values may of course be used to more accurately diagnose the opening status of intake valves 10. The two physical quantities normally have different threshold values, i.e. the threshold values of the intake-frequency component of intake pressure P differ from those of the intake-frequency component of rotation speed $\omega$.

It is important to note that the threshold values are not normally constant, but depend on engine status (i.e. the rotation speed $\omega$ of drive shaft 4, and the power generated by the engine). The threshold values with which the intake-frequency component of each physical quantity is compared are typically provided in a table drawn up experimentally and stored in a memory of control unit 20.

As opposed to two separate physical quantities, opening of intake valves 10 may be determined using only one physical quantity, typically intake pressure P, which is more directly affected by intake valves 10 opening. When starting internal combustion engine 1 (i.e. when drive shaft 4 is stationary), two separate physical quantities (intake pressure P and rotation speed ω, for which battery voltage V may be substituted) are normally always considered; whereas, when internal combustion engine 1 is running, only one physical quantity, typically intake pressure P, is normally considered.

When the rotation speed ω of drive shaft 4, when starting internal combustion engine 1, exceeds a threshold value higher than the maximum speed of starter motor 5, intake valves 10 are considered open, regardless of the intake-frequency components of the physical quantities. The reasoning here being that an increase in the rotation speed ω of drive shaft 4 over and above the maximum speed of starter motor 5 is a direct consequence of combustion in cylinders 2, which can only take place if at least some of intake valves 10 open.

Similarly, when intake pressure P, when starting internal combustion engine 1, is below a threshold value lower than atmospheric pressure, intake valves 10 are considered open, regardless of the intake-frequency components of the physical quantities. The reasoning here being that intake pressure P can only fall below atmospheric pressure as a result of intake by cylinders 2, which can only take place if at least some of intake valves 10 open.

When starting internal combustion engine 1, the physical quantities referred to above are easy to analyse, by being unaffected by pulsating combustion phenomena in cylinders 2, which introduce oscillatory phenomena covering a wide range of frequencies. When internal combustion engine 1 is running, on the other hand, the above physical quantities are harder to analyse, due to combustion phenomena in cylinders 2. Therefore, to analyse the intake-frequency components of the physical quantities (i.e. to determine opening of intake valves 10), it is advisable that engine 1 be in a stable operating condition. The best condition in which to analyse the intake-frequency components of the physical quantities (i.e. to determine opening of intake valves 10) is preferably the cut-off condition (no fuel injection), in which there is no combustion in cylinders 2, and engine 1 is therefore in a highly stable condition.

When internal combustion engine 1 is in a stable condition, a stationary wave can be determined in the intake-frequency component of the physical quantity, and opening of intake valves 10 is determined as a function of this stationary wave. It is important to note that, when internal combustion engine 1 is started, at least some of intake valves 10 must open: if none of intake valves 10 were to open, there would be no fresh-air intake into, and therefore no combustion inside, cylinders 2. When internal combustion engine 1 is running, non-opening of all of intake valves 10 is not an issue, and it only makes sense to determine non-opening of some (or, rather, at least one) of intake valves 10. Non-opening of at least one of intake valves 10, when internal combustion engine 1 is running, can be determined by analysing the amplitude and form of the stationary wave in the intake-frequency component of the physical quantity: when the amplitude of the stationary wave in the intake-frequency component of the physical quantity is too small, this may indicate some of intake valves 10 have not opened at all or enough; and, when the stationary wave in the intake-frequency component of the physical quantity shows cyclic irregularities, these may be caused by one or more intake valves 10 failing to open, or not opening enough.

When starting internal combustion engine 1, failure of intake valves 10 to open prevents the engine from being started, so must be diagnosed immediately; start-up of the engine must be aborted immediately, and the cause of the fault indicated. When internal combustion engine 1 is running, on the other hand, at least some of intake valves 10, as stated, must be open (otherwise the engine would die for lack of combustion in cylinders 2), so only abnormal opening of some of intake valves 10 need be diagnosed.

In a direct-injection internal combustion engine 1 (as shown in FIG. 2), fuel is injected directly into cylinders 2 and so does not depend on intake valves 10 opening. Conversely, in an indirect-injection internal combustion engine 1, fuel is injected upstream from intake valves 10, so that any irregularity in the opening of intake valves 10 also affects the amount of fuel fed to cylinders 2.

In a direct-injection internal combustion engine (as shown in FIG. 2), any intake valves 10 not opening properly obviously have a negative effect on combustion, by supplying the corresponding cylinder 2 with less than the expected amount of fresh air (i.e. combustion supporter), whereas fuel is injected normally, by not depending on intake valves 10 opening. This results in overly rich combustion, well in excess of the expected air/fuel ratio (normally close to the stoichiometric ratio). Excessively rich combustion (or at any rate with an air/fuel ratio well in excess of the expected ratio) is detected by the lambda/UEGO probes in the exhaust, and so does not go unobserved. Which means the above analysis of the intake-frequency component of the physical quantity (typically intake pressure P) may also be compared with/integrated in the combustion data supplied by the lambda/UEGO probes in the exhaust.

In other words, in a direct-injection situation, abnormal opening of intake valves 10 diagnosed by the above analysis of the intake-frequency component of the physical quantity (typically intake pressure P) may be confirmed by the presence of overly rich combustion (i.e. caused by combustion supporter shortage), seeing as intake valves 10 cannot possibly fail to open and still result in correct combustion (i.e. at the expected air/fuel ratio). In short, in a direct-injection situation, abnormal opening of intake valves 10, when internal combustion engine 1 is running, can be confirmed when the strength (i.e. air/fuel ratio) of the exhaust gases indicates excess fuel (i.e. a shortage of combustion supporter, i.e. too little air intake through intake valves 10 with respect to the fuel injected), and the excess fuel is manifested by an air/fuel ratio with more than the expected amount of fuel.

In a direct-injection internal combustion engine 1, the above analysis of the intake-frequency component of the physical quantity (typically intake pressure P) is vital to enable control unit 20 to determine the cause of overly rich combustion, and to prevent control unit 20, in the event of overly rich combustion caused by abnormal opening of intake valves 10, from attempting to correct the air/fuel ratio by simply adjusting control of injectors 19.

It is important to note that, by combining the, above analysis of the intake-frequency component of the physical quantity (typically intake pressure P) with the exhaust gas strength analysis, it is possible to accurately diagnose abnormal operation of even only one intake valve 10. This is normally complicated to do, on account of the limited effect abnormal operation of one intake valve 10 has on the operation of internal combustion engine 1 (the engine 1 shown has eight intake valves 10), but combining the analyses of two different phenomena (exhaust gas strength and oscillations in intake pressure P) enables any irregularity to be detected.

In the case of an indirect-injection internal combustion engine 1, the above analysis of the intake-frequency component of the physical quantity (typically intake pressure P) is the only way of enabling control unit 20 to determine the cause of any abnormal operation manifested in the form of a chronic lack of power output (i.e. power output continually well below expectations).

In a preferred embodiment, when commanded to start internal combustion engine 1, control unit 20 first attempts to start it in the usual way. If engine 1 fails to start within a given time interval (e.g. 3-5 seconds) from the start of the start-up procedure, control unit 20 checks correct opening of intake valves 10 as described above: if intake valves 10 are found open (i.e. intake pressure P is found to oscillate at intake frequency), control unit 20 looks for other reasons for the engine failing to start; conversely, if intake valves 10 are not found open (i.e. intake pressure P does not oscillate at intake frequency), control unit 20 cuts off fuel supply and at the same time closes throttle valve 11 completely to increase the fall in intake pressure P in intake manifold 9 and so make the intake-frequency oscillation in intake pressure P easier to recognize. After completely closing throttle valve 11, control unit 20 again checks correct opening of intake valves 10 (i.e. analyses intake pressure P to detect intake-frequency oscillation): if intake valves are still not found open in the above condition, control unit 20 diagnoses a definite problem with the opening of intake valves 10; conversely, if intake valves 10 are found open in the above condition, control unit 20 reconnects the fuel supply in an attempt to start internal combustion engine 1, and at the same time tries to determine the reason for the engine failing to start.

The above start-up strategy is designed to more accurately diagnose non-opening of intake valves 10, by repeatedly checking correct opening of intake valves 10 in the most favourable condition, i.e. with throttle valve 11 fully closed. A fully closed throttle valve 11 amplifies the variation in intake pressure P caused by the pump effect produced when intake valves 10 open, and so makes intake-frequency oscillation in intake pressure P easier to recognize.

The above method of determining opening of intake valves 10 has numerous advantages.

Firstly, it is cheap and easy to implement in an internal combustion engine electronic central control unit, by using measurements from sensors routinely provided in modern internal combustion engines, and by not requiring much computing power or memory storage space.

Secondly, it is highly effective, i.e. is able to diagnose non-opening of intake valves 10 quickly and accurately.

By immediately recognizing a problem in the opening of intake valves 10, emergency steps can be taken immediately to keep the vehicle running at a reduced performance level (as opposed to breaking down), as well as to minimize pollutant emissions by still enabling combustion in cylinders 2 in stoichiometric or close to stoichiometric conditions.

Determining malfunctioning of intake valves 10 enables more precise diagnosis of the reason, for example, for internal combustion engine 1 failing to start, thus making repair work much easier. That is, instead of changing control unit 20 or injectors 19, the control unit 20 "Valves Jammed" indication directs repair technicians to concentrate on the valve opening control device 16 controlling intake valves 10.

The North-American market calls for a misfire diagnosis also when starting up an internal combustion engine. In which case, the above method of determining opening of intake valves 10 may be integrated in the established start-up misfire diagnosis to determine misfiring caused by intake valves jammed during start-up.

The invention claimed is:

1. A method of determining opening of an intake valve of an internal combustion engine; the method comprising:
    determining the time pattern of an intake pressure in an intake manifold of the internal combustion engine;
    determining an intake-frequency component of the intake pressure; and
    determining opening of the intake valve as a function of the intake-frequency component of the intake pressure;
    further determining the time pattern of a rotation speed of a drive shaft of the internal combustion engine, or the time pattern of a voltage at the terminals of a battery of the internal combustion engine;
    determining an intake-frequency component of the rotation speed or voltage; and
    determining opening of the intake valve as a function of the intake-frequency component of the intake pressure, and also as a function of the intake-frequency component of the rotation speed or voltage.

2. A method as claimed in claim 1, and comprising the further step of establishing opening of the intake valve, if at least one intake-frequency component exceeds a first threshold value.

3. A method as claimed in claim 1, and comprising the further step of only establishing non-opening of the intake valve, if both the intake-frequency components are below respective first threshold values.

4. A method as claimed in claim 1, wherein opening of an intake valve is determined at start-up of the internal combustion engine.

5. A method as claimed in claim 4, and comprising the further step of closing a throttle valve of the internal combustion engine if, within a given time interval from starting the start-up procedure, the internal combustion engine does not start, and correct opening of the intake valve is not established.

6. A method as claimed in claim 5, and comprising the further steps of:
    cutting off fuel injection when the throttle valve is closed; and
    restarting fuel injection and reopening the throttle valve, if correct opening of the intake valve is established after the throttle valve is closed.

7. A method as claimed in claim 1, and comprising, at start-up of the internal combustion engine, the further steps of:
    determining a rotation speed of a drive shaft of the internal combustion engine; and
    establishing opening of the intake valve independently of the intake-frequency component of the intake pressure, of the rotation speed, or of the voltage, if the rotation speed exceeds a second threshold value higher than the maximum speed of a starter motor.

8. A method as claimed in claim 1, and comprising, at start-up of the internal combustion engine, the further steps of:
    determining an intake pressure in an intake manifold of the internal combustion engine; and
    establishing opening of the intake valve independently of the intake-frequency component of the intake pressure, of the rotation speed, or of the voltage, if the intake pressure is below a third threshold value lower than atmospheric pressure.

9. A method as claimed in claim 1, and comprising the further step, when the internal combustion engine is running, of waiting for the internal combustion engine to reach a steady condition, in particular the cut-off condition, before determining opening of the intake valve.

10. A method as claimed in claim 9, and comprising, when the internal combustion engine is running, the further steps of:
   determining a stationary wave in the intake-frequency component of the intake pressure, of the rotation speed, or of the voltage; and
   determining opening of the intake valve as a function of the stationary wave in the intake-frequency component of the intake pressure, of the rotation speed, or of the voltage.

11. A method as claimed in claim 10, and comprising the further step of establishing abnormal opening of the intake valve when the amplitude of the stationary wave in the intake-frequency component of the intake pressure, of the rotation speed, or of the voltage is too small.

12. A method as claimed in claim 10, and comprising the further step of establishing abnormal opening of the intake valve when the stationary wave in the intake-frequency component of the intake pressure, of the rotation speed, or of the voltage shows cyclic irregularities.

13. A method as claimed in claim 1, wherein the intake frequency equals the rotation speed of a drive shaft of the internal combustion engine multiplied by the number of intakes for each complete turn of the drive shaft.

14. A method as claimed in claim 1, and comprising, when the internal combustion engine is running and with direct fuel injection into the cylinders, the further steps of:
   determining the strength of the exhaust gases produced by combustion in the cylinders; and
   determining opening of the intake valve as a function of the intake-frequency component of the intake pressure, of the rotation speed, or of the voltage, and also as a function of the strength of the exhaust gases.

15. A method as claimed in claim 14, and comprising the further step of only confirming abnormal opening of the intake valve if the strength of the exhaust gases indicates an excess of fuel.

* * * * *